United States Patent
Furuno et al.

(10) Patent No.: US 7,280,667 B2
(45) Date of Patent: Oct. 9, 2007

(54) SPEAKER SYSTEM

(75) Inventors: Hajime Furuno, Osaka (JP); Tomohiro Yuzawa, Osaka (JP); Kunio Nishi, Osaka (JP); Haruo Takenaka, Osaka (JP); Masami Kobayashi, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 10/946,821

(22) Filed: Sep. 22, 2004

(65) Prior Publication Data
US 2005/0238196 A1 Oct. 27, 2005

(30) Foreign Application Priority Data
Apr. 26, 2004 (JP) ............... 2004-130168

(51) Int. Cl.
*H04R 25/00* (2006.01)
(52) U.S. Cl. ............ 381/386; 381/301; 381/182; 381/388
(58) Field of Classification Search .......... 381/300, 381/301, 303–307, 332–335, 182, 186, 386, 381/387, 345, 346, 348, 351–354; 181/144–147, 181/151, 155, 156, 198–199
See application file for complete search history.

(56) References Cited

U.S. PATENT DOCUMENTS

| | | | | |
|---|---|---|---|---|
| 4,998,283 A | * | 3/1991 | Nishida et al. ............. | 381/388 |
| 5,097,821 A | * | 3/1992 | Eakin .......................... | 601/47 |
| 5,307,418 A | * | 4/1994 | Sumitani ..................... | 381/307 |
| 5,970,161 A | * | 10/1999 | Takashima et al. ......... | 381/386 |

FOREIGN PATENT DOCUMENTS

| | | |
|---|---|---|
| JP | 40-23790 A | 8/1965 |
| JP | 58-95737 U | 6/1983 |
| JP | 59-196693 A | 11/1984 |
| JP | 01-198200 A | 8/1989 |
| JP | 1-143587 U | 10/1989 |

(Continued)

OTHER PUBLICATIONS

Nagaoka, Tetsuo, "Ultimate Solution of a Speaker System Integrated in a TV Stand Using Larger Units", Tetsuo Nagaoka's Speaker Craft ③, MX-127AV, pp. 195-202, pub. Dec. 20, 1993 (9 pp.), and English translation (3 pp.).

Nagaoka, Tetsuo, "Speaker System Integrated in a 33-Inch TV Stand, Rich Low-Frequency Range With Side-Mounted Woofers", Tetsuo Nagaoka's Speaker Craft ③, AV-18, pp. 158-166, pub. Dec. 20, 1993 (10 pp.), and English translation (4 pp.).

(Continued)

*Primary Examiner*—Huyen Le
(74) *Attorney, Agent, or Firm*—The Webb Law Firm

(57) ABSTRACT

A speaker system, preferably for a large-screen TV includes: a horizontal member including a left speaker, a right speaker and a center speaker and functioning as an enclosure for the left speaker, the right speaker and the center speaker, wherein each of the speakers includes at least one speaker element, and centers of the speaker elements of the speakers are all aligned along a single horizontal line; and a leg for holding the horizontal member in a horizontal position.

19 Claims, 5 Drawing Sheets

FOREIGN PATENT DOCUMENTS

| | | |
|---|---|---|
| JP | 01-270487 A | 10/1989 |
| JP | 3-147498 A | 6/1991 |
| JP | 04-325338 A | 11/1992 |
| JP | 5-297459 A | 11/1993 |
| JP | 3040883 U | 6/1997 |
| JP | 2001-268478 A | 9/2001 |
| JP | 2002-159089 A | 5/2002 |
| JP | 2003-204587 A | 7/2003 |
| JP | 2004-048168 A | 2/2004 |

OTHER PUBLICATIONS

Nagaoka, Tetsuo, "Situated Between a TV and a TV Stand, Matrix Type Version", Tetsuo Nagaoka's Speaker Craft ③, MX-20AV, pp. 174-179, pub. Dec. 20, 1993 (7 pp.), and English translation (3 pp.).

Japanese Utility Model Laid-Open Publication No. HEI 5-55686, published Jul. 23, 1993, entitled "Speaker System for Screen", applicant: Kenwood Corporation, inventor: Jun-ichi Hayakawa (partial English translation), 2 pp.

* cited by examiner

SPEAKER SYSTEM

BACKGROUND OF THE INVENTION

1. Field of the Invention

The present invention relates to a speaker system. More particularly, the present invention relates to a speaker system for large-screen TVs that is space-saving, can be set up with easy wire connections, and yet provides a high sound quality.

2. Description of the Related Art

Thin large-screen TVs, such as plasma TVs and LCD TVs, are recently gaining popularity at a considerable rate. Accordingly, it is believed that there is a rapidly-growing latent demand for household audio visual (AV) systems (so called "home theater systems") using thin large-screen TVs.

In fact, however, home theater systems have not yet been so widespread. Possible reasons for this include: (1) some houses may not have sufficient space for installing a speaker system for a home theater; (2) the connection between various units of the system may be complicated, and the wires are likely to be left showing in the room, which is aesthetically undesirable; and (3) some people do not want to install slender and tall speakers that are sold with large-screen TVs because they can fall down relatively easily.

Built-in speakers of large-screen TVs cannot provide a sound quality sufficient for images produced by a large screen. Therefore, movies, sports programs, etc., may not be enjoyed to the full extent.

In order to solve these problems, TV racks with built-in speakers have been proposed in the art (see, for example, Japanese Utility Model No. 3040883 and Japanese Laid-Open Patent Publication No. 2004-48168). However, with the rack of Japanese Utility Model No. 3040883, various units accommodating an amplifier, speakers, etc., need to be assembled together, thus failing to solve the problem that the user needs to make complicated connections between units. Moreover, the rack fails to provide any improvements in the sound quality. The rack of Japanese Laid-Open Patent Publication No. 2004-48168 includes speakers attached to a support member of the rack, with the support member being used as an acoustic tube, but fails to provide a sufficient surround sound effect for home theater systems. Moreover, the speakers are attached to the support member and are thus showing, which is not aesthetically desirable.

Thus, there is a strong demand for a speaker system for large-screen TVs that is space-saving and aesthetic, can be set up with easy wire connections, and yet provides a high sound quality.

SUMMARY OF THE INVENTION

It is therefore an object of the present invention to provide a speaker system for large-screen TVs that is space-saving and aesthetic, can be set up with easy wire connections, and yet provides a high sound quality and an excellent surround sound effect.

A speaker system according to an embodiment of the present invention includes: a horizontal member including a left speaker, a right speaker and a center speaker and functioning as an enclosure for the left speaker, the right speaker and the center speaker, wherein each of the speakers includes at least one speaker element, and centers of the speaker elements of the speakers are all aligned along a single horizontal line; and a leg for holding the horizontal member in a horizontal position.

In one embodiment of the invention, each of the left speaker, the right speaker and the center speaker includes at least one tweeter and at least one woofer.

In another embodiment of the invention, at least one of the left speaker, the right speaker and the center speaker further includes at least one duct.

In still another embodiment of the invention, the horizontal member includes a partition wall defining an internal space of each of the left speaker; the right speaker and the center speaker, the partition wall extending in a slant direction with respect to a speaker axis direction.

In still another embodiment of the invention, the partition wall is provided so that an angle between the partition wall and the speaker axis direction is 5 to 45 degrees.

In still another embodiment of the invention, a buffer space is defined between the left speaker and the center speaker and between the center speaker and the right speaker.

In still another embodiment of the invention, a sound absorbing material is provided in at least a portion of the buffer space.

In still another embodiment of the invention, the sound absorbing material is a cork or a polyethylene foam.

In still another embodiment of the invention, the buffer space is entirely filled with the sound absorbing material.

In still another embodiment of the invention, the sound absorbing material is attached to one side of the partition wall that is closer to the buffer space.

In still another embodiment of the invention, the horizontal member further includes a wire accommodating section.

In still another embodiment of the invention, the speaker system further includes an additional speaker in the leg.

In still another embodiment of the invention, the additional speaker provided in the leg is a subwoofer.

In still another embodiment of the invention, the leg includes an amplifier.

In still another embodiment of the invention, the leg functions as an internal space of the speaker system.

According to another aspect of the invention, the speaker system includes: a horizontal member including a left speaker, a center speaker and a right speaker and functioning as an enclosure for the left speaker, the right speaker and the center speaker, wherein the left speaker includes a tweeter, a woofer and a duct, the center speaker includes a tweeter, two woofers and a duct, and the right speaker includes a tweeter, a woofer and a duct; and legs for supporting opposite sides of the horizontal member to hold the horizontal member in a horizontal position, wherein centers of the tweeters, the woofers and the ducts provided in the horizontal member are all aligned along a single horizontal line.

In one embodiment of the invention, the horizontal member includes a partition wall defining an internal space of each of the left speaker, the right speaker and the center speaker, the partition wall extending in a slant direction with respect to a speaker axis direction.

In another embodiment of the invention, a buffer space is defined between the left speaker and the center speaker and between the center speaker and the right speaker.

According to still another aspect of the invention, a speaker system for a large-screen TV is provided. The speaker system includes: a horizontal member including at least one speaker and supporting a large-screen TV placed thereon, wherein centers of speaker elements of the at least one speaker are all aligned along a single horizontal line; and a leg for holding the horizontal member in a horizontal position.

DETAILED DESCRIPTION OF THE INVENTION

Preferred embodiments of the present invention will now be described with reference to the drawings. Note however that the present invention is not limited to the following embodiments.

Figure 1:
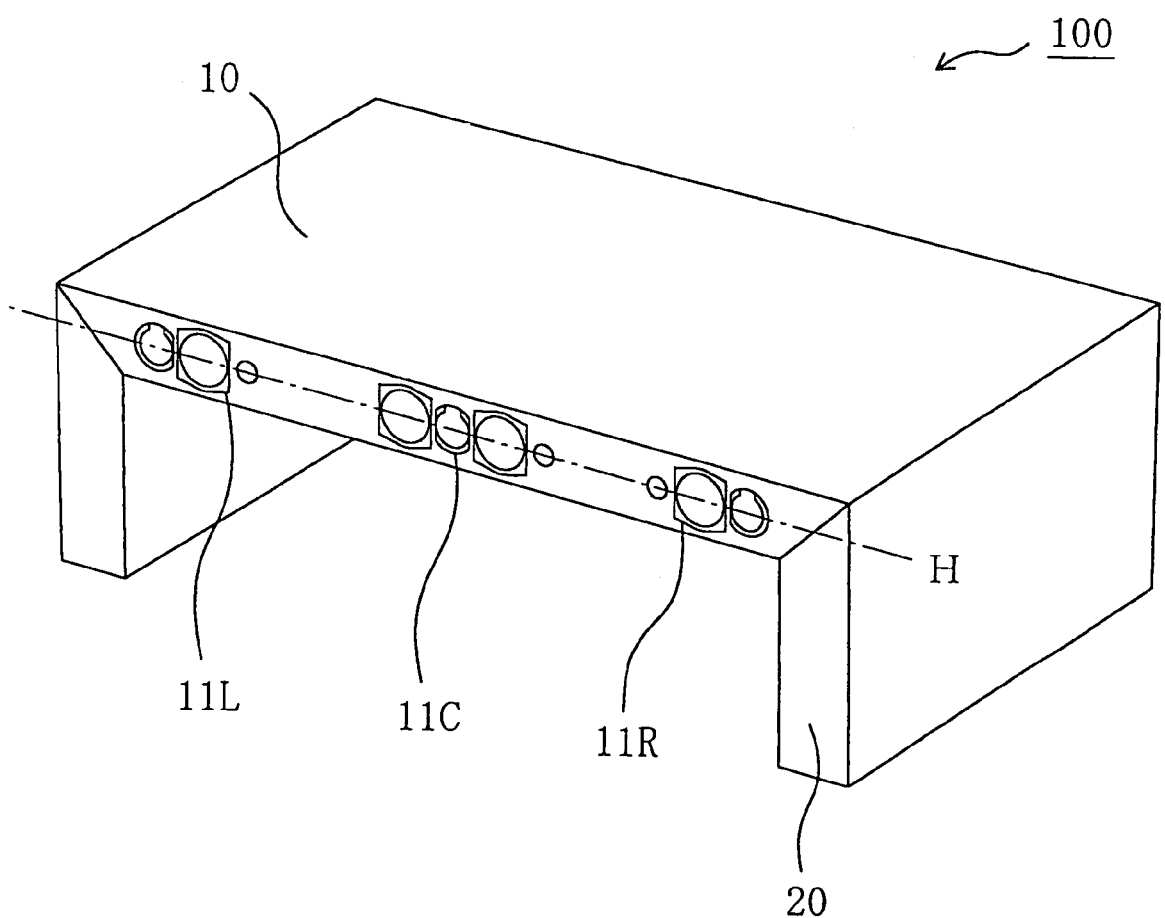
FIG. 1 is a schematic perspective view illustrating a speaker system according to a preferred embodiment of the present invention.
Figure 2:
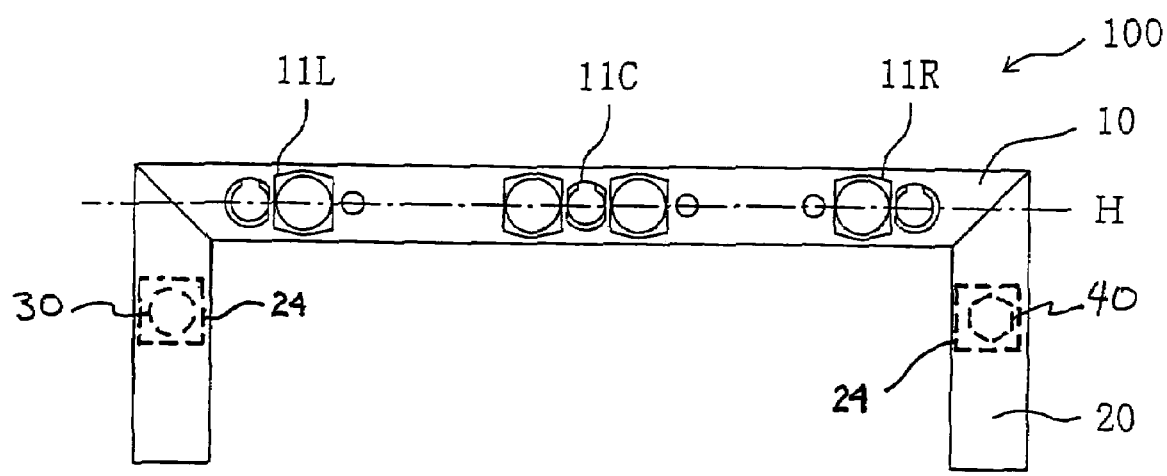
FIG. 2 is a front view of the speaker system of FIG. 1.
Figure 3:
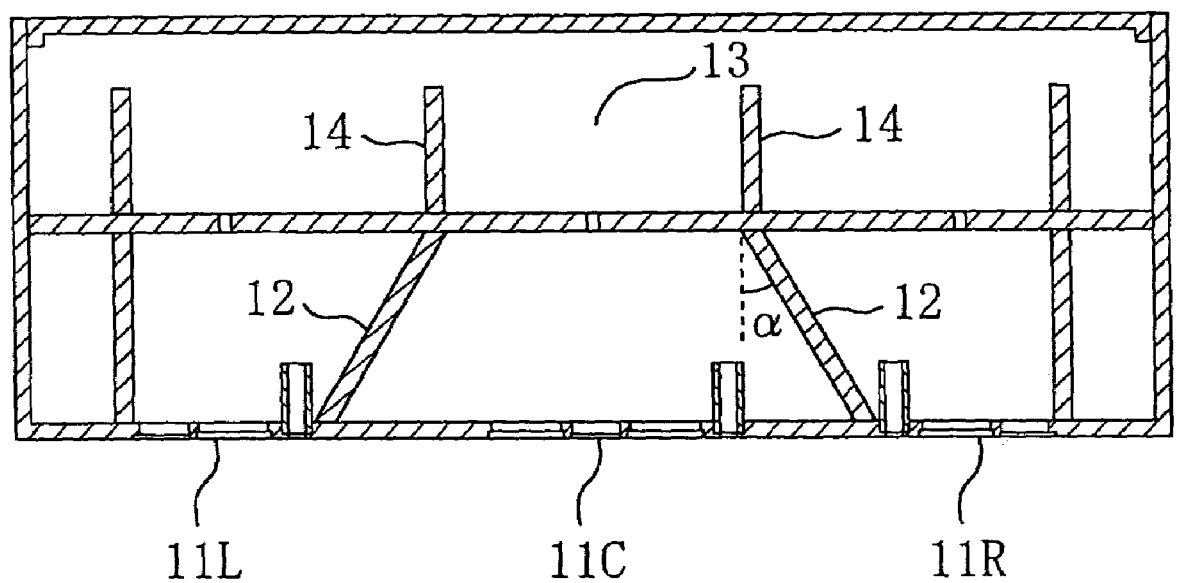
FIG. 3 is a cross-sectional view of the speaker system of FIG. 1 as viewed from above.
Figure 4:
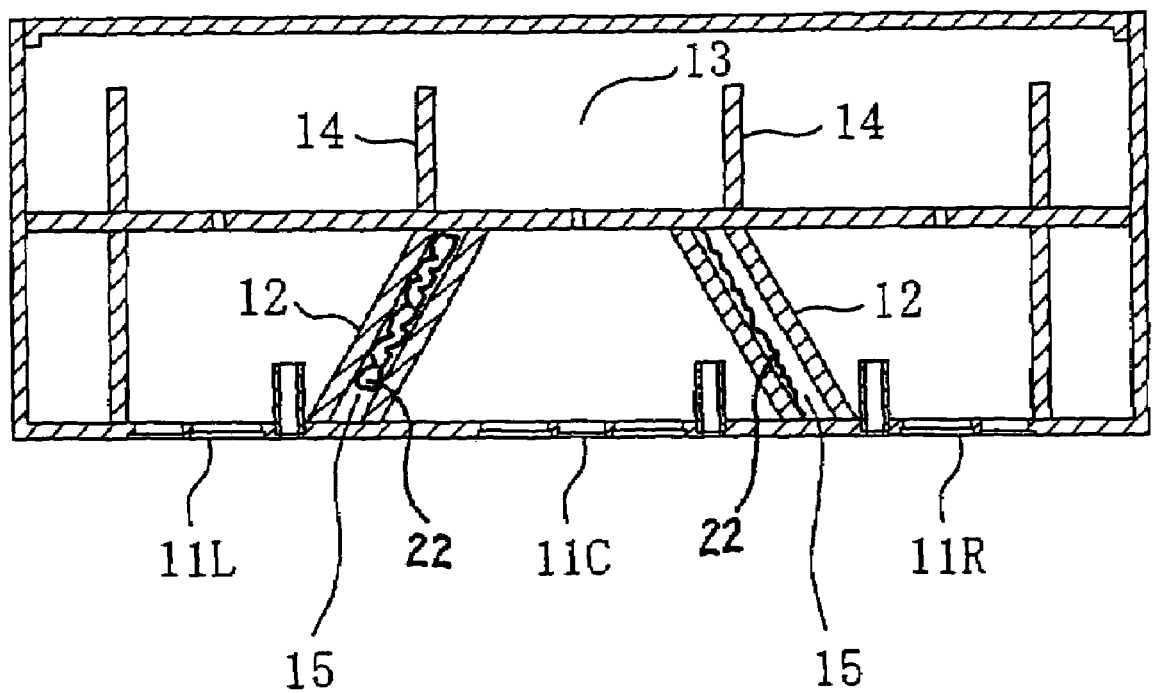
FIG. 4 is a cross-sectional view of a speaker system according to another preferred embodiment as viewed from above.

FIG. 1 is a schematic perspective view illustrating a speaker system 100 according to a preferred embodiment of the present invention. FIG. 2 is a front view of the speaker system 100 of FIG. 1. FIG. 3 is a cross-sectional view of the speaker system 100 of FIG. 1 as viewed from above. FIG. 4 is a cross-sectional view of a speaker system according to another preferred embodiment as viewed from above. The speaker system 100 includes a horizontal member 10 and legs 20 for supporting the horizontal member 10 in the horizontal position. The horizontal member 10 includes a left speaker 11L, a right speaker 11R and a center speaker 11C. Preferably, each of the left speaker 11L, the right speaker 11R and the center speaker 11C includes at least one tweeter and at least one woofer. In the illustrated example, the left speaker 11L and the right speaker 11R each include a tweeter and a woofer. The center speaker 11C includes a tweeter and two woofers. The type, arrangement and number of these speaker elements to be included in each speaker can be appropriately determined according to the purpose of the speaker system. At least one of the left speaker 11L, the right speaker 11R and the center speaker 11C includes at least one duct (acoustic tube), as necessary. The provision of a duct can further improve the sound quality for a low frequency range. In the illustrated example, each of the left speaker 11L, the right speaker 11R and the center speaker 11C includes a duct. The shape, number, arrangement, etc., of ducts to be provided can be appropriately determined according to the purpose of the speaker system.

The left speaker 11L, the right speaker 11R and the center speaker 11C of the horizontal member 10 are arranged so that the centers of the speaker elements (i.e., the centers of the tweeter and woofer diaphragms) are all aligned along a single horizontal line (the one-dot chain line H in FIG. 1). With such an arrangement, it is possible to deliver superb sound movement. Thus, it is possible to realize an excellent surround sound system with a simple arrangement.

Figure 5:
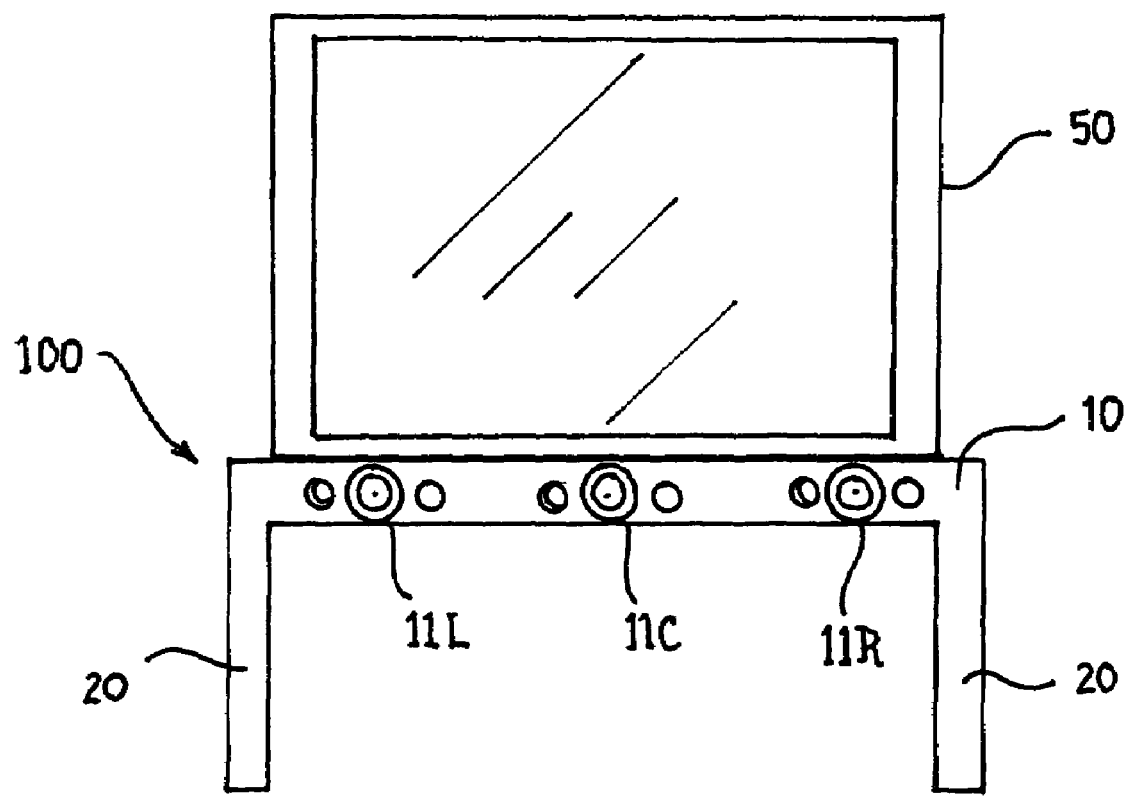
FIG. 5 is a schematic front view of the speaker system of FIG. 1 supporting a large-screen TV.

The horizontal member 10 functions as an enclosure for the left speaker 11L, the right speaker 11R and the center speaker 11C. Moreover, the horizontal member 10 has sufficient properties (e.g., a high strength, a large area and a high stability (being not rickety)) to support a large-screen TV 50 to be placed thereon. As a result of the horizontal member 10 having a sufficient area for the large-screen TV 50 to be placed thereon, the left speaker 11L, the right speaker 11R and the center speaker 11C each have a large internal space, whereby the sound quality thereof (particularly for a low frequency range) can be improved significantly. FIG. 5 illustrates an embodiment where the large-screen TV 50 is supported by the horizontal member 10.

The horizontal member 10 includes partition walls 12 defining the internal spaces of the left speaker 11L, the right speaker 11R and the center speaker 11C. The partition walls 12 function also as reinforcing members for the horizontal member 10, giving the horizontal member 10 a sufficient strength to support a large-screen TV to be placed thereon. Preferably, each partition wall 12 extends in a slant direction with respect to the speaker axis direction, as illustrated in FIG. 3. With such an arrangement, the occurrence of standing waves may be reduced. The angle between the partition wall 12 and the speaker axis direction (how much the partition wall 12 is angled as denoted by "α" in FIG. 3) can be appropriately determined according to the purpose of the speaker system, and is typically 5 to 45 degrees.

Preferably, a buffer space 15 is defined between the left speaker 11L and the center speaker 11C and between the center speaker 11C and the right speaker 11R, as illustrated in FIG. 4. For example, the buffer space 15 can be provided by using two spaced walls as each of the partition wall 12 between the left speaker 11L and the center speaker 11C and the partition wall 12 between the center speaker 11C and the right speaker 11R. With the provision of the buffer space 15, it is possible to prevent adverse influences from interaction between speakers, and to obtain a speaker system with an even better sound quality. As necessary, an appropriate sound absorbing material 22 may be provided in at least a portion of the buffer space 15. More specifically, the buffer space 15 may be entirely filled with a sound absorbing material 22, or a sound aborbing material 22 may be attached to one side of the partition wall 12 that is closer to the buffer space 15. With the provision of the sound absorbing material 22, it is possible to better prevent the interaction between speakers.

Preferably, the horizontal member 10 further includes a wire accommodating section 13, as illustrated in FIG. 3. Lead wires are all accommodated within the horizontal member 10 while being connected to the speakers (the left speaker 11L, the right speaker 11R and the center speaker 11C) at one end. As a result, it is possible to solve the problem of wires showing in the room, which is aesthetically undesirable. For example, the wire accommodating section 13 includes a structure (preferably a reel structure) 14 around which the wires can be wound up. With the structure 14, it is possible to adjust the length by which the speaker lead wires (on the TV side) are taken out of the speaker system, whereby it is possible to minimize the length of the wires being exposed in the room (outside the speaker system). In addition, in the wire accommodating section 13, the wire connections of the speakers (and also of other units such as the amplifier, as necessary) are already made, so that the user only needs to connect the TV-side end portions of the speaker lead wires to the speaker terminals of the TV. Thus, it is possible to obtain a user-friendly speaker system for large-screen TVs that can be set up with easy wire connections.

The legs 20 or leg means have sufficient properties (e.g., a high strength and a high stability (being not rickety)) to support the horizontal member 10 in the horizontal position with the large-screen TV 50 placed thereon. Such an arrangement is illustrated in FIG. 5. The structure of the legs 20 is not limited to any particular structure as long as the horizontal member 10 (as well as the large-screen TV 50) can be stably held in the horizontal position. Preferably, each leg 20 supports the entirety of one side of the horizontal member 10, as illustrated in FIG. 1. Such a structure provides a high holding stability. Moreover, each leg 20 may be hollow, in which case the leg 20 may accommodate an additional speaker and/or other units, as will be described later.

Preferably, each leg 20 can accommodate and additional speaker 24. The type and arrangement of the speakers 24 accommodated in the legs 20 can be appropriately determined according to the purpose of the speaker system. Either one or both of the legs 20 can accommodate a speaker 24 therein. Where speakers 24 are provided in both of the legs 20, the speakers 24 may be of the same type or of different types. Typically, a subwoofer 30 is provided in one of the legs 20, and in that case, an amplifier 40 can be provided in the other one of the legs 20, see FIG. 2. With such an arrangement, it is possible to realize a sound field with more realistic presence. Note that the wires of various units provided in the legs 20 can also be accommodated in the wire accommodating section 13 of the horizontal member 10.

While preferred embodiments of the present invention have been described above, the present invention is not limited to these embodiments. In an alternative embodiment, speakers may be provided on the side surfaces and/or the rear surface of the horizontal member 10. In another alternative embodiment, a damping material and/or a sound absorbing material (e.g., a cork or a polyethylene foam) may be provided between the horizontal member 10 and the legs 20. In still another embodiment, no units may be provided in the legs 20, in which case the legs 20 can be used as storage space. Note that while the partition walls extend in a slant direction in the embodiments above, they may alternatively extend parallel to the speaker axis direction. Accordingly, the buffer space may also extend parallel to the speaker axis direction.

According to the present invention, a left speaker, a right speaker and a center speaker are arranged so that the centers of the speaker elements are all aligned along a single horizontal line, whereby it is possible to deliver superb sound movement. Moreover, a horizontal member accommodating these speakers therein not only functions as an enclosure for these speakers, but also supports a large-screen TV placed thereon, whereby it is possible to significantly reduce the space for installing the TV and the speakers, as compared with conventional home theater systems. Moreover, the wire connections of the speakers are already made in the horizontal member, so that the user only needs to connect the speaker lead wires to the speaker terminals of the TV. Thus, the present system can be set up with easy wire connections. Moreover, most part of the speaker wires is accommodated within the horizontal member, thus avoiding an aesthetically undesirable situation where the wires between various units are left showing in the room. Thus, according to the present invention, it is possible to provide a speaker system for large-screen TVs that is space-saving and aesthetic, can be set up with easy wire connections, and yet provides a high sound quality.

The speaker system of the present invention can suitably be used as a speaker for large-screen TVs and/or a rack for large-screen TVs.

What is claimed is:

1. A speaker system, comprising:
    a horizontal member including a left speaker, a right speaker and a center speaker and functioning as an enclosure for the left speaker, the right speaker and the center speaker, wherein each of the speakers includes at least one tweeter and at least one woofer, and centers of the tweeters and woofers of the speakers are all aligned along a single horizontal line; and
    at least a pair of legs for holding the horizontal member in a horizontal position.

2. A speaker system according to claim 1, wherein at least one of the left speaker, the right speaker and the center speaker further includes at least one duct.

3. A speaker system according to claim 1, wherein the horizontal member includes a partition wall defining an internal space of each of the left speaker, the right speaker and the center speaker, the partition wall extending in a slant direction with respect to a speaker axis direction.

4. A speaker system according to claim 3, wherein the partition wall is provided so that an angle between the partition wall and the speaker axis direction is 5 to 45 degrees.

5. A speaker system according to claim 1, wherein a buffer space is defined between the left speaker and the center speaker and between the center speaker and the right speaker.

6. A speaker system according to claim 5, wherein a sound absorbing material is provided in at least a portion of the buffer space.

7. A speaker system according to claim 6, wherein the sound absorbing material is a cork or a polyethylene foam.

8. A speaker system according to claim 6, wherein the buffer space is entirely filled with the sound absorbing material.

9. A speaker system according to claim 6, wherein the sound absorbing material is attached to one side of a partition wall that is closer to the buffer space.

10. A speaker system according to claim 1, wherein the horizontal member further includes a wire accommodating section.

11. A speaker system according to claim 1, further comprising an additional speaker in at least one of the legs.

12. A speaker system according to claim 11, wherein the additional speaker provided in the leg is a subwoofer.

13. A speaker system according to claim 1, wherein at least one of the legs includes an amplifier.

14. A speaker system according to claim 1, wherein at least one of the legs is hollow and functions as an internal space of the speaker system.

15. A speaker system according to claim 1, wherein the horizontal member has a sufficient area to support a large-screen TV to be placed thereon.

16. A speaker system, comprising:
    a horizontal member including a left speaker, a center speaker and a right speaker and functioning as an enclosure for the left speaker, the right speaker and the center speaker, wherein the left speaker includes a tweeter, a woofer and a duct, the center speaker includes a tweeter, two woofers and a duct, and the right speaker includes a tweeter, a woofer and a duct; and
    legs for supporting opposite sides of the horizontal member to hold the horizontal member in a horizontal position,
    wherein centers of the tweeters, the woofers and the ducts provided in the horizontal member are all aligned along a single horizontal line.

17. A speaker system according to claim 16, wherein the horizontal member includes a partition wall defining an internal space of each of the left speaker, the right speaker and the center speaker, the partition wall extending in a slant direction with respect to a speaker axis direction.

18. A speaker system according to claim 17, wherein a buffer space is defined between the left speaker and the center speaker and between the center speaker and the right speaker.

19. A speaker system according to claim 16, wherein the horizontal member has a sufficient area to support a large-screen TV to be placed thereon.

\* \* \* \* \*